United States Patent
Tseng et al.

(10) Patent No.: US 12,368,499 B2
(45) Date of Patent: Jul. 22, 2025

(54) METHOD OF NON-TERRESTRIAL NETWORK ASSISTANCE INFORMATION UPDATE PROCEDURE AND RELATED DEVICE

(71) Applicant: SHARP KABUSHIKI KAISHA, Sakai (JP)

(72) Inventors: Yung-Lan Tseng, Taipei (TW); Chien-Chun Cheng, Taipei (TW); Chia-Hao Yu, Taipei (TW); Hung-Chen Chen, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 403 days.

(21) Appl. No.: 17/791,193

(22) PCT Filed: Jan. 6, 2021

(86) PCT No.: PCT/CN2021/070401
§ 371 (c)(1),
(2) Date: Jul. 6, 2022

(87) PCT Pub. No.: WO2021/139665
PCT Pub. Date: Jul. 15, 2021

(65) Prior Publication Data
US 2023/0344508 A1      Oct. 26, 2023

Related U.S. Application Data

(60) Provisional application No. 62/957,782, filed on Jan. 6, 2020.

(51) Int. Cl.
*H04B 7/185* (2006.01)
*H04W 56/00* (2009.01)

(52) U.S. Cl.
CPC ...... *H04B 7/18513* (2013.01); *H04W 56/005* (2013.01)

(58) Field of Classification Search
CPC ... H04W 84/06; H04W 48/12; H04W 56/001; H04W 56/005; H04W 56/0045;
(Continued)

(56) References Cited

U.S. PATENT DOCUMENTS

2009/0161599 A1   6/2009   Haartsen et al.
2019/0174554 A1*  6/2019   Deenoo ................ H04L 5/0098
(Continued)

FOREIGN PATENT DOCUMENTS

CN     104796927 A    7/2015

OTHER PUBLICATIONS

3GPP TS 38.211, "3rd Generation Partnership Project; Technical Specification Group Radio Access Network; NR; Physical channels and modulation (Release 15)", V15.7.0 (Sep. 2019).
(Continued)

*Primary Examiner* — Quoc Thai N Vu
(74) *Attorney, Agent, or Firm* — ScienBiziP, P.C.

(57) ABSTRACT

A method of a non-terrestrial network (NTN) assistance information update procedure for a user equipment (UE) is provided. The method includes receiving, by the UE from a first cell, first NTN assistance information associated with the first cell; and performing, by the UE, the NTN assistance information update procedure based on at least one of UE-specific control signaling or an NTN-specific system information block (SIB) by which the UE receives the first NTN assistance information.

6 Claims, 8 Drawing Sheets

(58) Field of Classification Search
CPC ..... H04W 72/23; H04B 7/185; H04B 7/1851; H04B 7/18513; H04B 7/18589; H04B 7/18595; H04B 7/2125
See application file for complete search history.

(56) References Cited

U.S. PATENT DOCUMENTS

2021/0306869 A1* 9/2021 Wei .................... H04B 7/1851
2022/0030532 A1* 1/2022 Hajir ................. H04B 7/18513

OTHER PUBLICATIONS

3GPP TR 38.821 V1.0.0 (Dec. 2019), 3rd Generation Partnership Project; Technical Specification Group Radio Access Network; Solutions for NR to support non-terrestrial networks (NTN) (Release 16) sections 6.3 and 7.2.1.1.

* cited by examiner

US 12,368,499 B2

METHOD OF NON-TERRESTRIAL NETWORK ASSISTANCE INFORMATION UPDATE PROCEDURE AND RELATED DEVICE

CROSS-REFERENCE TO RELATED APPLICATION(S)

The present disclosure is the National Stage of International Patent Application No. PCT/CN2021/070401, filed on Jan. 6, 2021, entitled "METHOD OF TIMING ADVANCE ADJUSTMENT IN NON-TERRESTRIAL NETWORK AND RELATED DEVICE," which claims the benefit of and priority to U.S. Provisional Patent Application Ser. No. 62/957,782, filed on Jan. 6, 2020, entitled "Timing Advance Adjustment in Non-terrestrial networks". The contents of all of above-mentioned applications are hereby fully incorporated by reference into the present disclosure.

FIELD

The present disclosure is generally related to wireless communications and more specifically, to a method of non-terrestrial network (NTN) assistance information update procedure and a related device.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of non-terrestrial network (NTN) assistance information update procedure and a related device.

According to an aspect of the present disclosure, a method of NTN assistance information update procedure for a user equipment (UE) is provided. The method includes receiving, by the UE from a first cell, first NTN assistance information associated with the first cell; and performing, by the UE, the NTN assistance information update procedure based on at least one of UE-specific control signaling and NTN-specific system information block (SIB) by which the UE receives the first NTN assistance information.

According to another aspect of the present disclosure, a UE for performing NTN assistance information update procedure is provided. The UE includes at least one processor, and at least one memory storing computer-executable instructions that, when executed by the at least one processor, cause the UE to perform the above-disclosed method timing advance adjustment.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
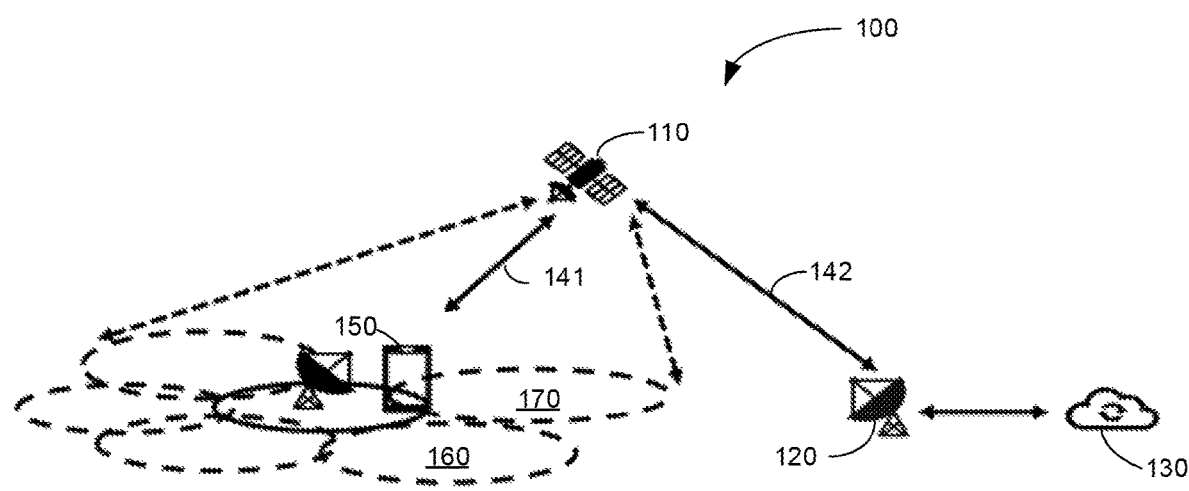
FIG. 1 is a schematic diagram illustrating a Non-terrestrial Network (NTN), according to an implementation of the present disclosure.

UThe following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or an New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE/NR SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided via an NR frame to support ProSe services or V2X services.

FIG. 1 is a schematic diagram illustrating the Non-terrestrial Network (NTN) 100, according to an implementation of the present disclosure. As illustrated in FIG. 1, the NTN 100 provides access for the UE 150. The NTN 100 may refer to a network, or segments of a network by using a spaceborne vehicle (e.g., satellite 110 or Unmanned Aircraft Systems (UAS) platform) for transmission (e.g., using a Low Earth Orbiting (LEO) satellite, and/or a Medium-Earth Orbit (MEO), and/or a Geostationary Earth Orbiting (GEO) satellite).

The NTN 100 typically features the following elements:
One or several sat gateways (e.g., gateway 120) that connect the NTN to a public data network (e.g., data network 130).

A GEO satellite is fed by one or several sat gateways that are deployed across the satellite targeted coverage (e.g. regional or even continental coverage). In this case, the UE 150 in the cell 160 is served by only one sat gateway.

A transparent GEO satellite network refers to a relay-based NTN that includes radio frequency (RF) functions only. The GEO satellite simply performs amplify-and-forward in space.

A Non-GEO satellite (e.g., LEO and MEO) served successively by one or several sat gateways at a time. The system ensures service link (e.g., service link 141) and feeder link (e.g., feeder link 142) continuity between the successive serving sat-gateways with sufficient time duration to proceed with mobility anchoring and hand-over (or conditional handover) procedure.

A transparent LEO satellite network refers to a relay-based NTN. In this case, the LEO satellite simply performs amplify-and-forward in space.

A regenerative LEO satellite network refers to a network architecture, where the LEO satellite has full capability of RAN functions as a base station in NR. In this case, UEs are served directly by the satellite 110.

A feeder link (e.g., the feeder link 142) refers to the radio link between a sat gateway and the satellite 110 (or UAS platform).

A service link (e.g., the service link 141) refers to the radio link between the UE 150 and the satellite 110 (or UAS platform).

A satellite (or UAS platform) (e.g., the satellite 110) that may implement either a transparent or a regenerative (with onboard processing) payload. The satellite (or UAS platform) generates RF beams typically generate several beams (e.g., the beam footprint 170) over a given service area bounded by its field of view. The footprints of the beams are typically of elliptic shape. The field of view of a satellite (or UAS platforms) depends on the onboard antenna diagram and min elevation angle.

It is noted that a transparent payload may be processed by RF filtering, frequency conversion and amplification. Hence, the waveform signal repeated by the payload is un-changed. A regenerative payload may be processed by RF filtering, frequency conversion and amplification as well as demodulation/decoding, switch and/or routing, coding/modulation. This is effectively equivalent to having all or part of base station functions (e.g., gNB) on board the satellite (or UAS platform).

Inter-satellite links (ISL) optionally in case of a constellation of satellites. This will require regenerative payloads on board the satellites. ISL may operate in RF frequency or optical bands.

A UE (e.g., the UE 150) is served by the satellite 110 (or UAS platform) in a targeted service area.

GEO refers to a circular orbit at 35,786 km above the Earth's equator and following the direction of the Earth's rotation. An object in such an orbit has an orbital period equal to the Earth's rotational period and thus appears motionless, at a fixed position in the sky, to ground observers.

LEO refers to an orbit around the Earth with an altitude between 300 km, and 1500 km. MEO refers to a region of space around the Earth above LEO and below GEO. Minimum Elevation angle refers to a minimum angle under which the satellite or UAS platform can be seen by a terminal.

Non-Geostationary Satellites refers to Satellites (LEO and MEO) orbiting around the Earth with a period that varies approximately between 1.5 hours and 10 hours. It is necessary to have a constellation of several Non-Geostationary satellites associated with handover mechanisms to ensure service continuity.

NTN-gateway (also sate Gateway (e.g., the gateway 120)) refers to an earth station or gateway is located at the surface of Earth and providing sufficient RF power and RF sensitivity for accessing to the satellite (resp. HAPS). NTN Gateway is a transport network layer (TNL) node.

One-way latency refers to a time period required to propagate through a telecommunication system from a terminal to the public data network or from the public data network to the terminal. This is especially used for voice and video conference applications.

Regenerative payload refers to the payload that transforms and amplifies an uplink RF signal before transmitting it on the downlink. The transformation of the signal refers to digital processing that may include demodulation, decoding, reencoding, re-modulation and/or filtering.

Round Trip Delay (RTD) refers to the time period required for a signal to travel from a terminal to the sat gateway or from the sat gateway to the terminal and back. This is especially used for web-based applications.

A satellite (e.g., the satellite 110) refers to a space-borne vehicle embarking a bent pipe payload or a regenerative payload telecommunication transmitter, placed into LEO, MEO, or GEO.

A satellite beam (e.g., the beam footprint 170) refers to a RF-beam generated by an antenna on-board a satellite. An NTN cell may be implemented on either type of network above. Normative work may focus on the satellite-based network to provide broadband service in unserved areas for mobile devices and vehicle-mounted devices.

Figure 2:
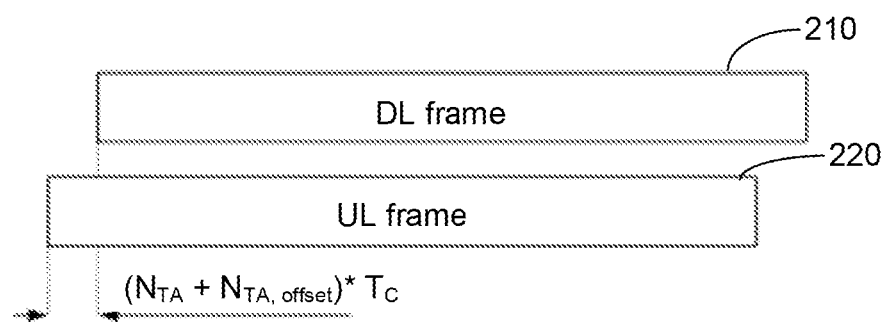
FIG. 2 is a schematic diagram illustrating a DL/UL timing relationship, according to an implementation of the present disclosure.

The present disclosure relates to timing advance adjustment that involves UL timing advance alignment between a UE and a serving cell (e.g., a BS). FIG. 2 is a schematic diagram illustrating a DL/UL timing relationship, according to an implementation of the present disclosure. In the cellular network, due to the propagation between DL and UL direction (e.g., DL frame 210 and UL frame 220 of FIG. 2), the UE needs to adjust uplink timing advance (TA) values in different situations. TA value may be obtained based on the equation (1) as follows:

$$\text{Timing Advance}=(N_{TA}+N_{TA,\textit{offset}})*T_C \quad (1)$$

where $T_C$ may be a fixed value pre-defined in the 3GPP technical specification (e.g., 0.509 ns in the 3GPP technical specification). $N_{TA}$, offset is a fixed value that may be configured by a serving cell via broadcasting system information (e.g., SIB1) or a UE-specific dedicated control signaling (e.g., DL RRC signaling, such as RRC (Connection) Reconfiguration message). In addition, a UE may determine the value of $N_{TA}$ based on the following conditions:

Condition A: While the UE Initiates a Random Access Procedure to Transmit a Preamble (Along with or without Physical Uplink Shared Channel (PUSCH) Transmission)

Based on the 3GPP technical specification (e.g., 3GPP TS 38.211 v15.7.0), the UE may set $N_{TA}=0$ when the UE transmits a preamble during a random access (RA) procedure. The starting position $t_{start}^{RA}$ of the PRACH preamble in a subframe (for $\Delta f_{RA} \in \{1.25,5,15,30\}$ kHz) or in a 60 kHz slot (for $\Delta f_{RA} \in \{60,120\}$ kHz) is given by $$t_{start}^{RA} = t_{start,l}^{\mu}$$

$$t_{start,l}^{\mu} = \begin{cases} 0 & l = 0 \\ t_{start,l-1}^{\mu} + (N_u^{\mu} + N_{CP,l-1}^{\mu}) \cdot T_c & \text{otherwise} \end{cases}$$

where
the subframe or 60 kHz slot is assumed to start at t=0;
a timing advance value $N_{TA}=0$ shall be assumed;
$N_u^{\mu}$ and $N_{CP,l-1}^{\mu}$ are given by clause 5.3.1 of TS 38.211 v15.7.0;
$\mu=0$ shall be assumed for $\Delta f_{RA} \in \{1.25,5\}$kHz, otherwise it is given by $\Delta f_{RA} \in \{15,30,60,120\}$kHz and the symbol position l is given by $$l=l_0+n_t^{RA}N_{dur}^{RA}+14n_{slot}^{RA"}$$

where the value of $N_{TA}$ may be set to zero for a preamble transmission of a RA procedure.

It is noted that condition A may happen in Contention-Based Random Access (CBRA) procedure and Contention-Free Random Access (CFRA) procedure. Condition A may also happen in a 4-step RA procedure (e.g., the PUSCH transmission is not transmitted with the preamble transmission) and 2-step RA procedure (e.g., the PUSCH transmission may be transmitted with the preamble transmission). In addition, condition A may happen in other procedures that includes a preamble transmission, such as RRC Connection Setup procedure, RRC Connection Resume procedure, Tracking area update procedure, RAN Notification Area Update procedure, SCG addition/change procedure (e.g., Secondary node addition, Master Node (MN) initiated secondary node modification, SN initiated secondary node modification with/without MN involvement, MN/SN initiated secondary node change), PSCell change procedure, inter-RAT/intra-RAT/inter-system handover procedure, conditional handover procedure, MN to eNB/gNB change, eNB/gNB to MN change, on-demand System Information request procedure, etc.

Condition B: While the UE Decodes Random Access Response (RAR) from a Serving Cell Successfully During a CBRA procedure, the UE may obtain TA command from a serving cell by receiving a Random Access Response (RAR) message of the CBRA procedure. In condition B, the amount of the time alignment for the carrier of Subcarrier Carrier Spacing (SCS) of $2^{\mu}$. 15 kHz is $N_{TA}=TA*16*64/2^{\mu}$ and it is relative to the SCS of the first uplink transmission from the UE after the UE receives the RAR message. In the RAR message, the serving cell may configure a TA value with a range of index values {0, 1, 2, . . . 3846} and the serving cell transmits one index value associated one of one (unique) TA value in the RAR message to the UE.

Condition C: While the UE is in RRC Connected State

In condition C, a serving cell may transmit a dedicated control signaling (e.g., Medium Access Control (MAC) Control Element (CE)) in the Physical Downlink Shared Channel (PDSCH) to indicate the UE to adjust its TA value. Moreover, condition C may be realized via a closed-loop approach and a new $N_{TA}$ value (e.g., $N_{TA\_new}$) may be configured based on the current $N_{TA}$ value (e.g., $N_{TA\_old}$). For example, the $N_{TA}$ value may be obtained based on the equation (2) as follows:

$$N_{TA\_new}=N_{TA\_old}+(T_A-31)\cdot 16\cdot 64/2^{\mu} \quad (2)$$

In the MAC CE, the serving cell may configure a TA value with a range of index values {0, 1, 2, . . . 63}, which each index may be associated with one (unique) TA value.

Since the propagation delay between a UE and an NTN cell may be very large. In condition A, instead of setting $N_{TA}=0$ blindly in the first UL transmission (e.g., in the preamble transmission w/wo PDSCH transmission during a 2-step/4-step RA procedure), the UE may perform a pre-compensation to transmit a preamble based on an estimated TA value (e.g., a compensation TA value). In this disclosure, the $N_{TA}$ value that the UE applies for the preamble transmission is represented as $N_{TA\_pre}$.

In one implementation, a serving NTN cell may transmit NTN assistance information to the UE, so that the UE estimates a TA value (e.g., $N_{TA\_pre}$) based on (all or part of) the received NTN assistance information. In one example, the serving NTN cell may broadcast a common TA value directly to UEs. Thus, one UE may transmit a selected preamble by setting the $N_{TA\_pre}$=the common TA value. In another example, the serving NTN cell may broadcast location information of at least one geographical reference point (e.g., the geographical reference point may be any point on the ground or even in the air) to UEs. Thus, one UE (e.g., a UE that is capable to estimate a TA value (e.g., $N_{TA\_pre}$) by calculating a physical distance between the UE and the serving NTN cell) may transmit a selected preamble by setting the $N_{TA\_pre}$=the TA value estimated by the UE itself. It is noted that the common TA value may be a time-varying parameter (for example, to an earth-fixed cell which broadcasts common timing advance value to UEs, the earth-fixed cell may need to update the common timing advance value continuously. Similarly, to an earth-moving cell that broadcasts at least one geographical reference point, the earth-fixed cell may need to update the location information of reference point(s) continuously).

In one implementation, the $N_{TA\_pre}$ may be applied to the condition B. For example, $N_{TA}=N_{TA\_pre}+T_A*16*64/2^{\mu}$ when the UE performs the pre-compensation to estimates and set the $N_{TA\_pre}$.

Figure 3:
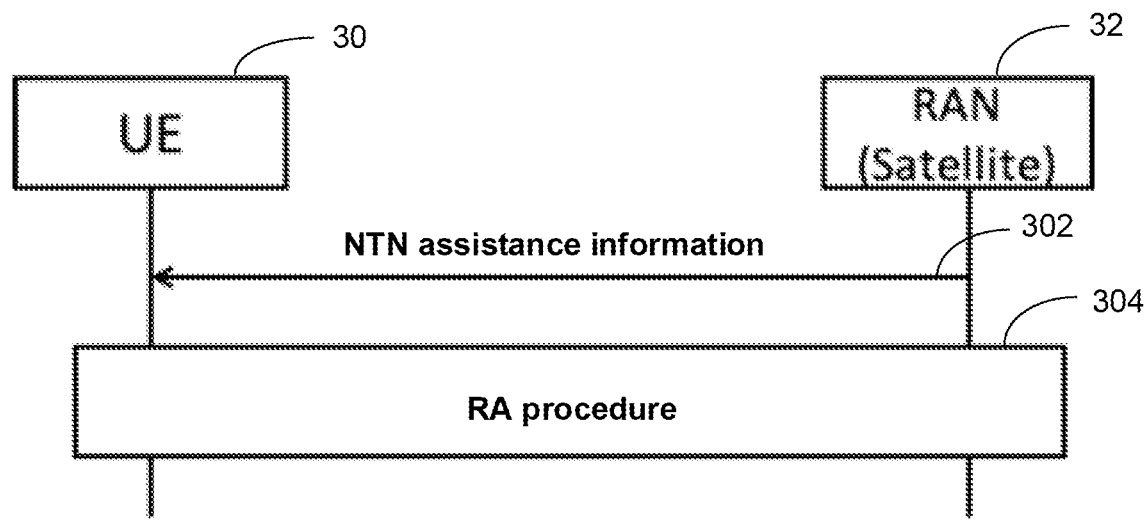
FIG. 3 is a flowchart illustrating an NTN assistance information delivery procedure, according to an implementation of the present disclosure.

FIG. 3 is a flowchart illustrating an NTN assistance information delivery, according to an implementation of the present disclosure. In action 302, the UE 30 may receive one or more NTN assistance information from its serving RAN 32 (e.g., a serving NTN cell that may be located on a satellite). Then, after receiving the one or more NTN assistance information from the serving RAN 32, the UE 30 may estimate a TA value according to the NTN assistance information received from the serving RAN 32. In action 304, the UE 30 may initiate a (2-step/4-step) RA procedure and then start the first message transmission based on the estimated TA value.

In FIG. 3, the RA procedure includes two types of RA procedures: 4-step RA procedure (with MSG1 transmission) and 2-step RA procedure (with MSGA transmission). Both types of RA procedure further include contention-based random access (CBRA) and contention-free random access (CFRA). In some implementations, the UE may determine which type of RA procedure to be applied based on a network configuration.

In one example, when CFRA resources are not configured to the UE (by the serving cell), an Downlink Reference Signal Received Power (DL-RSRP) threshold may be configured for the UE to choose between the 2-step RA procedure and the 4-step RA procedure while the UE is triggered by the upper layers (e.g., the Radio Resource Control (RRC) Layer in the UE side) to initiate a TA procedure;

In another example, when CFRA resources for 4-step RA procedure are configured to the UE, the UE may perform 4-step RA procedure;

In other examples, when CFRA resources for 2-step RA procedure are configured, the UE may perform 2-step RA procedure.

In some implementations, the serving RAN may not configure both CFRA resources for 4-step and 2-step RA procedures jointly on an Uplink Bandwidth Part (BWP) configuration. In some additional implementations, CFRA with 2-step RA type is supported only for handover procedure, conditional handover procedure, or SCG addition/change procedure.

FIGS. 4A-4D are flowcharts illustrating CBRA and CFRA procedures that include 2-step RA procedure and 4-step RA procedure, according to an implementation of the present disclosure.

a) Contention-Based 4-Step RA Procedure

Figure 4:
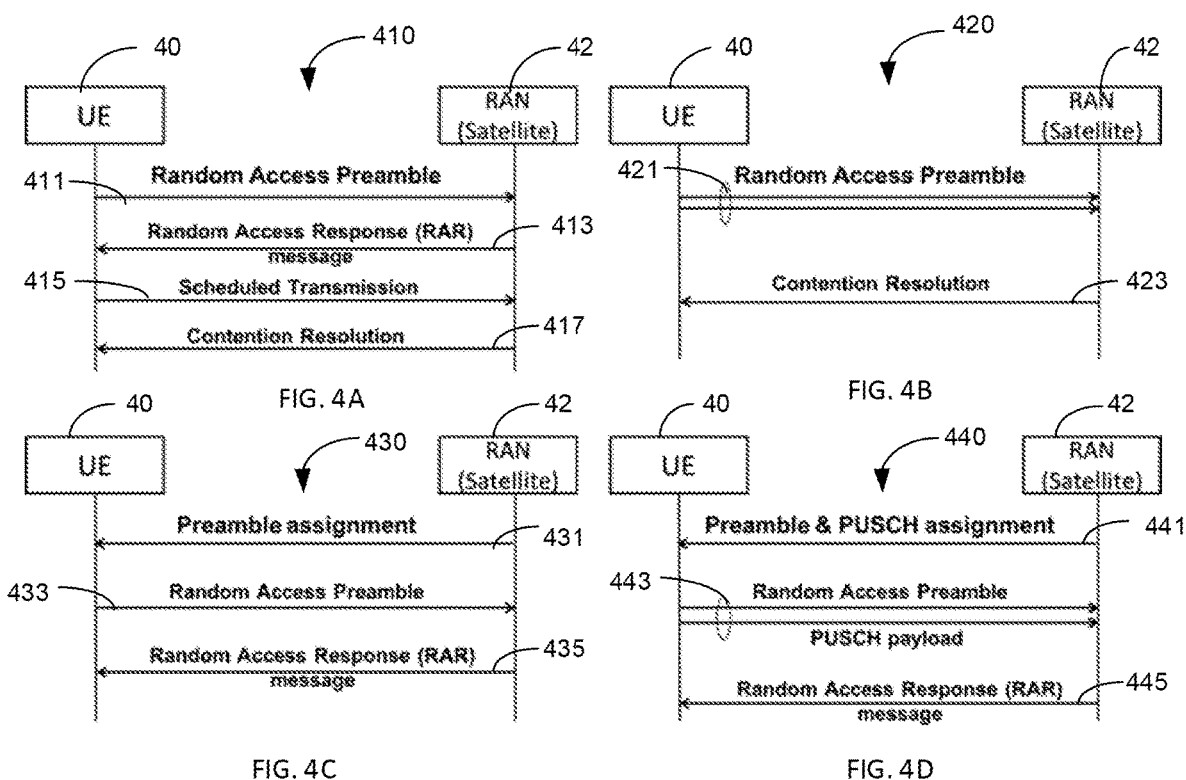
FIGS. 4A-4D are flowcharts illustrating Contention-Based/Contention-Free (CB/CF) random access (RA) procedures that include 2-step RA procedure and 4-step RA procedure, according to an implementation of the present disclosure.

The 4-step CBRA procedure 410 is illustrated in FIG. 4A. The UE 40 may firstly select one preamble among a group of preambles, which is pre-defined by the serving RAN, to the serving RAN 42. Then, in action 411, the UE 40 may transmit the selected preamble at least once at the beginning of the contention-based 4-step RA procedure. Then, after transmitting the UE selected preamble, in action 413, the UE may monitor DL channels of the serving cell in the serving RAN 42 (e.g., initial BWP in DL direction) for the RAR message during a pre-defined time interval (e.g., RAR window in time domain). Please note, the UE 40 may decide the UL TA value for the preamble transmission (and/or the following UL signaling transmission) based on the NTN assistance information.

In the RAR message, the serving cell (in the serving RAN 42) may configure UL physical resource and one temporary UE ID for the UE 40 to scramble and transmit the UL message (e.g., UL RRC messages, such as RRCSetupRequest message, RRCResumeRequest message, RRCReestablishmentRequest message, or other UL control signaling) transmission in the following scheduled transmission. The UE 40 may transmit the UL message on the scheduled UL physical resource. In some implementations, the serving cell (in the serving RAN 42) may configure backoff parameters for a backoff time period calculation in the RAR message to the UE 40. After receiving the backoff parameters, the UE 40 may initiate another RA procedure after a backoff time period, which may be decided by the UE 40 based on the backoff parameters received in the RAR message.

Then, in action 415, the UE 40 may transmit one (or more) UL message (e.g., UL RRC message) on the UL physical resource configured by the serving cell in the serving RAN 42 in the action 413. Please also note, in some additional implementations, the serving cell (in the serving RAN 42) may instruct one TA command on the RAR message received in action 413. So, in action 415, the UE 40 may adjust the TA value for the scheduled (UL) transmission based on the UE-decided TA value in the action 411 and the received TA command in action 413.

Thus, after transmitting the following UL message to the serving cell (in the serving RAN 42) in action 415, the UE 40 may monitor whether the serving cell (in the serving RAN 42) receives the UL message successfully (the serving cell (in the serving RAN 42) may transmit one ACK message in action 417 to the UE 40 if the UL message is received successfully by the serving cell in the RAN 4013). After action 417, the UE 40 and the serving RAN 42 may continue the following DL/UL packet exchanges if the UL message has been received by the serving cell (in the serving RAN 42) successfully (and so the contention-based 4-step RA procedure is considered as successful). Otherwise, the UE 40 may consider this random access fails (may be due to collision with other UEs) and thus the UE 40 may re-start another RA procedure.

b) Contention-Based 2-Step RA Procedure

The 2-step CBRA procedure 420 is illustrated in FIG. 4B. The UE 40 may firstly select one preamble among a group of preambles, which is pre-defined by the serving RAN 42 (or the serving cell in the serving RAN 42). Then, in action 421, the UE 40 may transmit the selected preamble at least once at the beginning of the contention-based 2-step RA procedure. In addition, also in action 421, the UE 40 may also transmit a PUSCH payload along with the preamble to the serving cell (in the serving RAN 42). The UL physical resources for the PUSCH transmission may be pre-configured by the serving cell (in the serving RAN 42). So, in the contention-based 2-step RA procedure, the MSGA, which is transmitted by the UE 40 in action 421, includes both the UE-selected preamble and PUSCH payload. The UE 40 may decide the UL TA value for the preamble transmission (and/or the following PUSCH payload transmission in the same MSGA) in action 421 based on the NTN assistance information. After MSGA transmission, in action 423, the UE 40 may monitor DL channels of the serving cell (in the serving RAN 42) for a (Random Access) response from the network within a configured time window. In the contention resolution of the contention-based 2-step RA procedure, the UE 40 may receive an ACK message from the serving RAN in action 423 as the PUSCH payload has been received by the serving cell (in the serving RAN 42) successfully (so the contention-based 2-step random access procedure ends). In some implementations, the UE 40 may receive one fallback indication from the RAR message of the serving cell in the serving RAN 42 (which is also known as MSGB in the 2-step RA procedure) in action 423. After receiving the fallback indication in the MSGB from the serving cell in the serving RAN 42, the UE 40 may perform MSG3 transmission (as the scheduled transmission in the contention-based 4-step RA procedure, such as action 415) and then monitors contention resolution (e.g., as action 417). If contention resolution is not successful after MSG3 (re)transmission(s), the UE 40 may re-start another 2-step RA procedure.

c) Contention-Free 4-Step RA Procedure

The 4-step CFRA procedure 430 is illustrated in FIG. 4C. The UE 40 may firstly receive preamble assignment from the serving cell (in the serving RAN 42) in action 431. The preamble assignment may be included in the handover command, conditional handover command or condition re-configuration command, which may be included in one (or more) RRCReconfiguration message delivered by the serving cell (in the serving RAN 42). In addition, the preamble assignment may be associated with the target cell (in the serving RAN 42) of the triggered contention-free 4-step RA procedure. Please note, the UE 40 may decide the UL TA value for the assigned preamble transmission based on the NTN assistance information. Then, after transmitting the assigned preamble to the target cell (in the serving RAN 42) in action 433, the UE 40 may monitor the DL channels for the RAR message reception (during the RAR time window, in action 435). The contention-free 4-step RA procedure may be considered successful after receiving an ACK indication in the RAR message from the target cell (in the serving RAN 42) in action 435.

d) Contention-Free 2-Step RA Procedure

The 2-step CFRA procedure 440 is illustrated in FIG. 4D. The UE 40 may firstly receive preamble assignment along with PUSCH assignment from the serving cell (in the serving RAN 42) in the action 441. The preamble assignment may be included in the handover command, conditional handover command or condition re-configuration command, which may be included in one (or more) RRCReconfiguration message delivered by the serving cell (in the serving RAN 42). In addition, the preamble assignment may be associated with the target cell (in the serving RAN 42) of the triggered contention-free 2-step RA procedure. Please note, the UE 40 may decide the UL TA value for the assigned preamble transmission and/or the following PUSCH payload transmission in the same MSGA based on the NTN assistance information. Then, after transmitting the assigned preamble (along with PUSCH payload transmission in the same MSGA) to the target cell in action 443, the UE 40 may monitor the DL channels for the RAR message reception (during the RAR time window). The contention-free 2-step RA procedure may be considered successful after receiving an ACK indication in the RAR message from the serving cell (in the serving RAN 42) in the action 445. Otherwise, the UE 40 may re-start a 4-step RA procedure or another 2-step RA procedure if no ACK indication is received by the UE 40 in the action 445.

For random access in a cell configured with SUL carrier (supplementary uplink carrier), the network may explicitly signal which carrier to use (Normal UL (NUL) carrier or Supplementary UL (SUL) carrier). In some implementations, the NTN assistance information may include different timing advance information (e.g., common TA value) for NUL/SUL carrier respectively. In some other implementations, different NTN assistance information may be configured for NUL/SUL carrier respectively. In some additional implementations, the NTN assistance information may include TA information only for NUL carrier or SUL carrier (so the UE may set $N_{TA}=0$ for the first message transmission if the UE selects SUL carrier to implement RA procedure but no TA information is provided to be associated with the SUL carrier). In some additional implementations, the NTN assistance information may include one common TA information, which can be shared by NUL and SUL carrier. Therefore, the UE may decide which TA information to be applied based on which UL carrier the RA procedure is implemented (e.g., the MSG1/MSGA is transmitted on which UL carrier).

Conditional Handover (CHO)

In some implementations, a CHO command may include at least one of triggering condition(s), a leaving condition, a target cell ID, a carrier frequency (e.g., NR-Absolute Radio Frequency Channel Number (ARFCN)) of the target cell, a life time of the CHO, a handover priority (i.e., HO priority, or CHO command priority), a CHO command ID, dedicated Random Access Channel (RACH) configuration(s), and common RACH configuration(s) (e.g., for optionally providing resources for a contention-free random access).

In some implementations, a CHO command may include one or more target cells (e.g., candidate target cells). In some implementations, a target cell of a CHO command may be configured with a cell priority and/or access control parameters (e.g., AC barring factor). In some implementations, a target cell of a CHO command without a cell priority may access a default cell priority.

Figure 5:
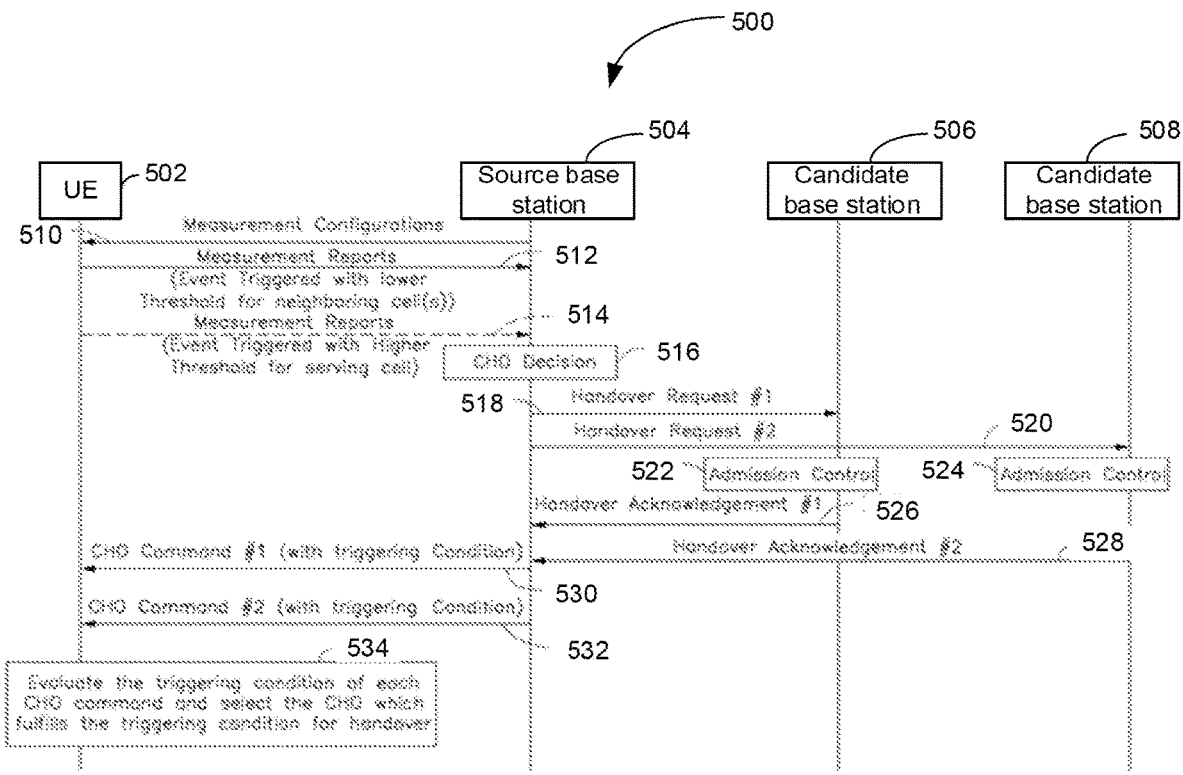
FIG. 5 is a flowchart illustrating a conditional handover procedure, according to an implementation of the present disclosure.

FIG. 5 is a diagram illustrating a CHO procedure, according to an implementation of the present disclosure. CHO procedure 500 may involve the UE 502, the source base station (e.g., gNB) 504, one or more candidate base station(s) (e.g., gNB) 506 and 508. It should be noted that the source and candidate base stations may be any combination of other types of base stations in some of the present embodiments. For example, any of the source and/or candidate base stations may be an eNB in some of the present embodiments. That is, in some implementations, source base station 504 may be an eNB, while candidate base station 506 may be a gNB (or an eNB) and candidate base station 508 may be an eNB (or a gNB). Conversely, source base station 504 may be a gNB, while candidate base station 506 may be an eNB (or a gNB) and candidate base station 508 may be a gNB (or an eNB). Please also note, each base station would configure one or more cell(s), which is one logical entity configured by base station to operate in one specific frequency carrier, to communicate with one or more UE. So, to the UE 502, one source NR cell may be configured by the source base station 504, one candidate NR cell may be configured by the candidate base station 506 and another candidate NR cell may be configured by the candidate base station 508, to serve the UE. In addition, each cell configured by the base station may serve one or more UEs under the (DL/UL) radio coverage of the base station.

During the CHO procedure 500, in action 510, the source base station 504 may provide measurement configurations to the UE 502, where the measurement configurations may include relaxed threshold(s) to trigger early measurement reports for determining potential candidate cell(s) (which each candidate cell is associated with one candidate bae station) for a (conditional) handover. For example, a relaxed threshold may be a lower threshold for neighboring cells and/or a higher threshold for the serving cell for a measurement event which may trigger the measurement report(s).

In action 512, the UE 502 may send a measurement report(s) to the source base station 504 when a measurement event criterion is met (e.g., when an event is triggered by a lower threshold set for a neighboring cell(s)). In action 514, the UE 502 may send another measurement report(s) to the source base station 504 when another measurement event criterion is met. For example, when another event is triggered by a higher threshold set for the serving cell or primary cell (e.g., when the serving cell quality drops lower than a preconfigured threshold or when the primary cell quality drops lower than a preconfigured threshold).

In action 516, after receiving the measurement reports from the UE 502, the source base station 504 may make a CHO decision. Thereafter the source base station 504 may send a corresponding Handover Request message to each of the potential candidate base stations. During the CHO procedure 500, in action 518, the source base station 504 may send Handover Request message #1 to the candidate base station 506. In action 520, the source base station 504 may also send Handover Request message #2 to the candidate base station 508.

In actions 522 and 524, the candidate base stations 506 and 508 may respectively perform admission control procedures. Thereafter, in action 526, the candidate base station 506 may send Handover Acknowledgement message #1 to the source base station 504 when the candidate base station 506 accepts the handover request from the source base station 504. Similarly, in action 528, the candidate base station 508 may send Handover Acknowledgement message #2 to the source base station 504 when the candidate base station 508 accepts the handover request from the source base station 504. Thereafter, the source base station 504 may send CHO command #1 (or CHO configuration) to the UE 502 in action 530 in response to Handover Acknowledgement message #1, and CHO command #2 (or CHO configuration) to the UE 502 in response to Handover Acknowledgement message #2 in action 532. Each of the CHO commands may include at least one triggering condition for a CHO procedure. Note that a CHO command may contain one or more candidate cell(s) with the same triggering condition(s) (or different triggering condition(s) in some implementations). In addition, whether one or more candidate cells (/one or more candidate base stations) is included in a CHO command may depend on NW decision. A UE (e.g., UE 502) may store more than one CHO command associated with the candidate cells of the same candidate base station or the candidate cells of different candidate base stations (e.g., associated with candidate base station 506/508). A UE may receive a first HO command and then may receive a second HO command from the source base station. For example, the source base station may receive measurement results associated with cells belonging to different base stations. Then, a source station may send CHO command request to different base stations. In some examples, the gNB may add/remove/modify/suspend the candidate cell(s) and corresponding trigger conditions/parameters via another RRC messages (e.g., CHO Command #2), where the information field in CHO Command #2 may label the UE action (e.g., add/remove one or more indicated parameter/configuration) to the UE. In some additional implementations, the UE may implement delta signaling by jointly considering the CHO Command #1 (received in action 530) and CHO Command #2 (received in action 532). So, the UE may replace all or part of the stored CHO command #1 based on the parameters/configurations received in the CHO Command #2. In some additional implementations, UE may keep the parameters/configurations indicated by the CHO Command #1 if the parameters/configurations are not overwritten by the CHO Command #2.

After receiving the CHO command message(s), in action 534, the UE 502 may start evaluating the triggering condition(s) to determine whether a triggering condition(s) for the CHO command message(s) is met while continuing operating in its current RRC configuration. When the UE 502 determines that a triggering condition associated with one candidate cell, which is indicated by the stored CHO Command, is fulfilled, the UE 502 may access the corresponding CHO command to connect to the candidate cell (e.g., associated with the candidate base station 506 or 508), which becomes the target cell to the UE after the triggering condition is fulfilled. In some implementations, the NTN assistance information may be included in the Conditional Handover Command (e.g., CHO Command #1 or CHO Command #2). In addition, delta signaling approach may be provided in the conditional handover procedure. For example, while one NTN assistance information #1 is provided in the CHO Command #1 and another NTN assistance information #2 is provided in the CHO Command #2. In some implementations, the UE may replace the stored NTN assistance information #1 with the NTN assistance information #2. In some implementations, the UE may provide an updated NTN assistance information #3 by jointly referring to the stored NTN assistance information #1 and the newly received NTN assistance information #2.

Methods for an NTN cell to transmit NTN assistance information to assist UEs to estimate TA values are disclosed.

Method 1: NTN Assistance Information Transmission Via Broadcasting System Information (SI)

NTN assistance information may be broadcasted by a serving NTN cell and some are illustrated in Table 1.

TABLE 1

| NTN assistance information |
|---|
| NTN assistance information | (1) a common TA value ($N_{TA\_common}$) may be configured in the NTN assistance information. Each UE may set $N_{TA\_pre}$ = the latest received $N_{TA\_common}$ before the UE transmits a preamble of a RA procedure.<br>(2) location information of at least one geographical reference point (e.g., a geographical location of an NTN Gateway (NTN GW) or other reference points) may be configured in the NTN assistance information. Each UE may calculate the $N_{TA\_pre}$ by jointly considering location information of the UE, NTN cell, and/or the reference point(s).<br>(3) a feeder link delay may be included in the NTN assistance information. |
| Format of $N_{TA\_common}$ | (1) a value of $N_{TA\_common}$ may be zero, a positive (integer) value, or a negative (integer) value.<br>(2) a set of indices may be configured to be associated with a set of pre-defined values (e.g., $N_{TA\_common}$ = {0, 1, 2, 3, 4 . . . 100} and each value is associated with one pre-defined index) and the mapping rules may also be pre-defined in the 3GPP technical specifications. Thus, the serving NTN cell may transmit an index value, wherein each index value may be associated with one (unique) TA value indication, to the UE, So, the UE can calculate the NTA pre based on a (pre-configured) formula accordingly.<br>(3) a scaling factor may be configured to be associated with the set of pre-defined values of $N_{TA\_common}$. For example, given a scaling factor $f_{scal}$ = 2, then the range of $N_{TA\_common}$ values becomes $N_{TA\_common}$ = {−200, −198, . . . , −2, 0, 2, . . . 200}. The value of $f_{scal}$ may also be broadcasted via System Information (SI) coming with $N_{TA\_common}$. It is noted that the scaling factor may also be a part of the NTN assistance information. In addition, it is also applicable to other embodiments about NTN assistance information. For example, the serving NTN cell may indicate the value of $f_{scal}$ via a dedicated control signaling (e.g., RRC signaling or MAC CE dedicated to one UE).<br>(4) Range-specific scaling factor: a value of $f_{scal}$ may be further associated with different physical distances between the UE and the serving NTN cell. For example, two scaling factors {$f_{scal\#1}$, $f_{scal\#2}$} and one range factor $R_m$ (e.g., $R_m$ = 1000 Km) may be broadcasted via SI. In addition, the value of $R_m$ is applied by a UE as a decision factor in the defined range-specific scaling factor mechanism. For example, based on the $R_m$ value, one served UE (e.g., UE#1) may apply $f_{scal\#1}$ for the $N_{TA\_common}$ if UE#1's physical distance to the serving NTN cell is larger than (or equivalent to) $R_m$. In contrast, one served UE (e.g., UE#2) may apply $f_{scal\#2}$ for the $N_{TA\_common}$ if UE#2's physical distance to the serving NTN cell is smaller than $R_m$. The rules may be pre-defined in the 3GPP technical specifications. Note that, in some examples, there may be a |

TABLE 1-continued

NTN assistance information

| | |
|---|---|
| | set of range factors (e.g., ($R_{m\#1}$, $R_{m\#2}$, ... $R_{m\#n}$)) to be configured in SI (or pre-installed in USIM of the UE or pre-defined in specs), and thus one UE may decide UE's range based on the given range factor set. In addition, one set of scaling factors ({ $f_{scal\#1}$, $f_{scal\#2}$, ... $f_{scal\#n+1}$}) may also be configured to be associated with the range factor set. Thus, the UE may decide which scaling factor to be applied for the $N_{TA\_common}$ after deciding its range based on the range factor set. In addition, the UE may also modify/change the scaling factor accordingly by the UE itself while the physical distance between the UE and the serving base station (associated with the serving cell) changes. <br>(5) Mobility-specific scaling factor: a value of fscal may be further associated with the relative speed between the UE and the serving NTN cell (e.g., the UE with Global Navigation Satellite System (GNSS) capability may estimate its relative speed with the serving NTN cell). For example, two scaling factors { $F_{scal\#1}$, $F_{scal\#2}$ } and one mobility state factor $M_m$ (e.g., $M_m$ = 100 Km/s) may be broadcasted via SI. In addition, the value of $M_m$ is applied by the served UEs as a decision factor in the defined mobility-specific scaling factor mechanism. For example, based on the $M_m$ value, one served UE (e.g., UE#1) may apply $F_{scal\#1}$ for the $N_{TA\_common}$ if UE#1's relative speed with the serving NTN cell is larger than (or equivalent to) $M_m$. In contrast, one served UE (e.g., UE#2) may apply $F_{scal\#2}$ for the $N_{TA\_common}$ if UE#2's relative speed with the serving NTN cell is smaller than $M_m$. The rules may be pre-defined in the 3GPP technical specifications. Note that, in some examples, there may be a set of mobility state factors (e.g., ($M_{m\#1}$, $M_{m\#2}$, ... $M_{m\#n}$)) to be configured via SI (or pre-installed in USIM of the UE or pre-defined in the 3GPP technical specifications), and thus the UE may decide UE's mobility state factor based on the given mobility state factor set and the relative speed between the UE and the serving NTN cell. In addition, one set of scaling factors ({ $F_{scal\#1}$, $F_{scal\#2}$, ... $F_{scal\#n+1}$}) may also be configured to be associated with the mobility state factor set. Thus, the UE may decide which scaling factor to be applied for the $N_{TA\_common}$ after deciding its relative speed and the mobility state factor set. In addition, the UE may also modify/change the scaling factor accordingly by the UE itself while the relative speed between the UE and the serving base station (associated with the serving cell) changes. |
| Format of reference point | The format of a reference point may refer to GNSS or other technologies (e.g., NR positioning technique).<br>(1) The reference point can be determined via a real geographical location (e.g., the location of a Gateway (GW) station or a Very Small Aperture Terminal (VSAT) location) by GNSS information.<br>(2) For the earth moving beam, the reference point may be determined by calculating the shortest distance between a given cell on the ground and a BS.<br>(3) For earth fixed beam, the reference point may be defined virtually, it may be a point that achieves the minimum propagation delay between a serving cell on the ground and a BS.<br>In some examples, coordinates of reference points (e.g., three-dimensional coordinates (x, y, z)) may be provided. In addition, for the simplification of presentation, a set of indices may be pre-defined in each domain:<br>Index_X_coordinate is associated with an integer range from (−X1, . . . , 0, . . . , +X1) in X domain.<br>Index_Y_coordinate is associated with an integer range from (−Y1, . . . , 0, . . . , +Y1) in Y domain.<br>Index_Z_coordinate is associated with an integer range from (−Z1, . . . , 0, . . . , +Z1) in Z domain.<br>In addition, the formula about how to map each index to a physical location is also pre-defined (e.g., pre-defined in the 3GPP technical specification). Thus, a serving cell may transmit the location information of reference points by transmitting the corresponding indices in each domain and the UE knows how to estimate the physical distance between the UE and the reference points based on the received indices. |
| | In addition, in some examples, the following information may be broadcasted as part of the information of the reference point(s):<br>1. NTN cell (satellite) position<br>2. NTN cell (satellite) trajectory<br>3. GW position |
| Transmission approach (via SI) | (1) a serving cell may transmit NTN assistance information via Master Information Block (MIB).<br>(2) a serving cell may transmit NTN assistance information via SIB1 (e.g., in the Information Element (IE) 'ServingCellConfigCommonSIB').<br>(3) a UE may be required/instructed to obtain the latest NTN assistance information to estimate the $N_{TA\_pre}$ value. Otherwise, the UE may not be allowed to transmit a preamble. In contrast, if the UE does not intend to transmit a preamble, the UE is not obliged to monitor the latest NTN assistance information. In other words, the UE may not need to monitor an NTN-specific SIB update if the UE does not intend to transmit a preamble.<br>(4) a UE may decide which rule (Rule#1: the UE sets a default configuration (e.g., $N_{TA}$ = 0 or other value), or Rule#2: the UE sets $N_{TA}$ = $N_{TA\_pre}$ = $N_{TA\_common}$) based on a control signaling received from a serving cell (e.g., whether NTN assistance information is transmitted or not). The UE may follow Rule#2 if NTN assistance information is received from the serving cell. Otherwise, the UE may follow Rule#1 if the serving cell does not provide NTN assistance information to the UEs. The rules may be pre-defined in the 3GPP technical specification.<br>(5) the 3GPP technical specification may indicate that NTN assistance information may not be transmitted via a SI on-demand procedure. |
| Changes of NTN assistance information (via SI) | (1) a serving cell may transmit the NTN assistance information in other SI (e.g., an "NTN-specific SIB" may be configured and broadcasted by the serving cell). In addition, the serving cell may change the NTN assistance information via the SI directly. In other words, the changes of NTN assistance information may neither result in SI change notifications nor in a modification of valueTag in SIB1 (or the valueTag of the NTN-specific SIB).<br>(2) an "NTN (Common) TA modification bit" may be provided in a paging message (e.g. short (paging)) message that is transmitted in a Physical Downlink Control Channel (PDCCH)). For example, the UE may start to monitor and update/modify the stored NTN assistance information if the NTN (Common) TA modification bit = 1 is set in the short message. In contrast, the UE may keep the stored NTN assistance information (if there is any) without monitoring the NTN assistance information broadcasting via SI if the NTN (Common) TA modification bit = 0 (or absent/not defined in a specific short message format) in the short message. |

Note:
(1) In some examples, the UE may not be allowed (or the UE may be disabled) to transmit the selected preamble (no matter in CBRA/CFRA) unless the UE has calculated the value of $N_{TA\_pre}$.
(2) For a UE in the NR RRC Inactive state, the UE may initiate an RRC Connection Resume procedure (e.g., for data exchange or RNA update) with one NTN cell by transmitting a selected preamble according to $N_{TA\_pre}$ estimated based on the received NTN assistance information.

TABLE 1-continued

NTN assistance information (3) In some examples, for a UE in the LTE RRC Inactive state, the UE may initiate an RRC Connection Resume procedure (e.g., for data exchange or RNA update) with one NTN cell by transmitting a selected preamble according to the pre-compensated TA value based on the broadcasted NTN assistance information. In other examples, a UE may store the received NTN assistance information and initiate a validity timer (e.g., a validity-life-period timer for the NTN assistance information update via a broadcasting message). Then, the UE may count the validity timer to zero when the UE receives the NTN assistance information from the UE's serving cell successfully. While the validity timer is counting, the UE may decide the NTA value for a preamble transmission based on the stored NTN assistance information that triggers the validity timer. The UE may determine the stored NTN assistance information is valid when the validity timer is running (e.g., not counted to zero). In addition, the UE may need not to re-obtain NTN assistance information by monitoring the broadcasting system information from the serving cell (in contrast, the UE always needs to monitor the latest NTN assistance information by monitoring the SI broadcasted by the serving cell). On the other hand, when the validity timer expires (e.g., the timer is counted to zero), the stored NTN assistance information may be considered invalid by the UE. In addition, the UE may release the stored NTN assistance information (e.g. refresh the NTN assistance information from its memory module) and try to re-obtain NTN assistance information (e.g., a new NTN assistance information) from the serving cell (e.g., by monitoring the SI broadcasted by the serving cell). Thus, the UE may reset the validity timer and then re-start the validity timer when the UE re-obtains & stores the new NTN assistance information. In some examples, a value of validity timer may be pre-configured in the 3GPP technical specification or be pre-installed in the UE (e.g., pre-installed in USIM of the UE). In other examples, a value of validity timer may be configured by the serving cell (e.g., by broadcasting SI or by a dedicated control signaling, such as RRC signaling (e.g., RRC Connection Release message w/wo suspend configuration, which instructs the UE to move to RRC Inactive state/RRC Idle state respectively)). (4) Please also note, in some implementations, the UE may release/drop/remove/delete the UL TA value, which is derived by the UE based on the inventions in the present disclosure, while the UE is instructed to reset the MAC entity by the upper layers (e.g., the RRC entity may instruct the MAC entity to be reset through internal control signaling in the UE side). In some additional implementations, the RRC entity of the UE side may instruct the MAC entity to be reset while the RRC entity receives 'full configuration' instruction from the serving cell (e.g., the serving cell may instruct 'full configuration' to the UE through broadcasting system information or through UE-specific DL control signaling, such as DL-RRC signaling).

Method 2: NTN Assistance Information Transmission Via UE-Specific Dedicated Control Signaling For a UE in NR/LTE RRC Connected state, the UE may obtain NTN assistance information by receiving a dedicated control signaling (e.g., RRC signaling) from the serving NTN cell. Several alternatives for dedicated control signaling are disclosed.

Alternative 1: NTN Assistance Information Transmission Via RRC Connection Reconfiguration Message In one implementation, the serving NTN cell may transmit NTN assistance information via a dedicated control signaling (e.g., in the IE 'dedicatedSIB1-Delivery' or 'dedicatedSystemInformationDelivery', which is transmitted in one RRC Connection Reconfiguration message). After receiving the RRC Connection Reconfiguration message, the UE may decide the value of $N_{TA\_pre}$ accordingly. Alternative 1 may apply to SCG add/modification and PSCell change procedure in Multi-RAT Dual Connectivity (MR-DC) scenarios, where an MN may be an LTE eNB or an NR gNB. In this case, the dedicated control signaling may be an LTE-RRCConnectionReconfiguration message or a NR-RRCReconfiguration message.

Alternative 2: Intra-RAT Handover Procedure

The UE may perform an intra-RAT handover procedure, to handover from a source cell to a target cell. In one example, the source cell is a Terrestrial Network (TN) cell and the target cell is an NTN cell. In another example, the source cell is an NTN cell, and the target cell is an NTN cell. Both the TN cell and NTN cell are included in 5G NR RAT. In some additional implementations, both the TN cell and NTN cell are included in 5G E-UTRA RAT.

In this case, the serving NTN cell may transmit NTN assistance information via an RRC Connection Reconfiguration message (e.g., in the IE reconfigurationwithsyne), to initiate/trigger the intra-RAT handover procedure. After the UE receives the RRC Connection Reconfiguration message including the NTN assistance information, the UE may decide the value of $N_{TA\_pre}$ accordingly (e.g., by setting the $N_{TA\_pre}$=the received $N_{TA\_common}$). Thus, the UE performs a preamble transmission of a RA procedure with the target cell according to the $N_{TA\_pre}$.

Alternative 3: Inter-RAT Handover Procedure (Handover to NR NTN Cell)

Figure 6:
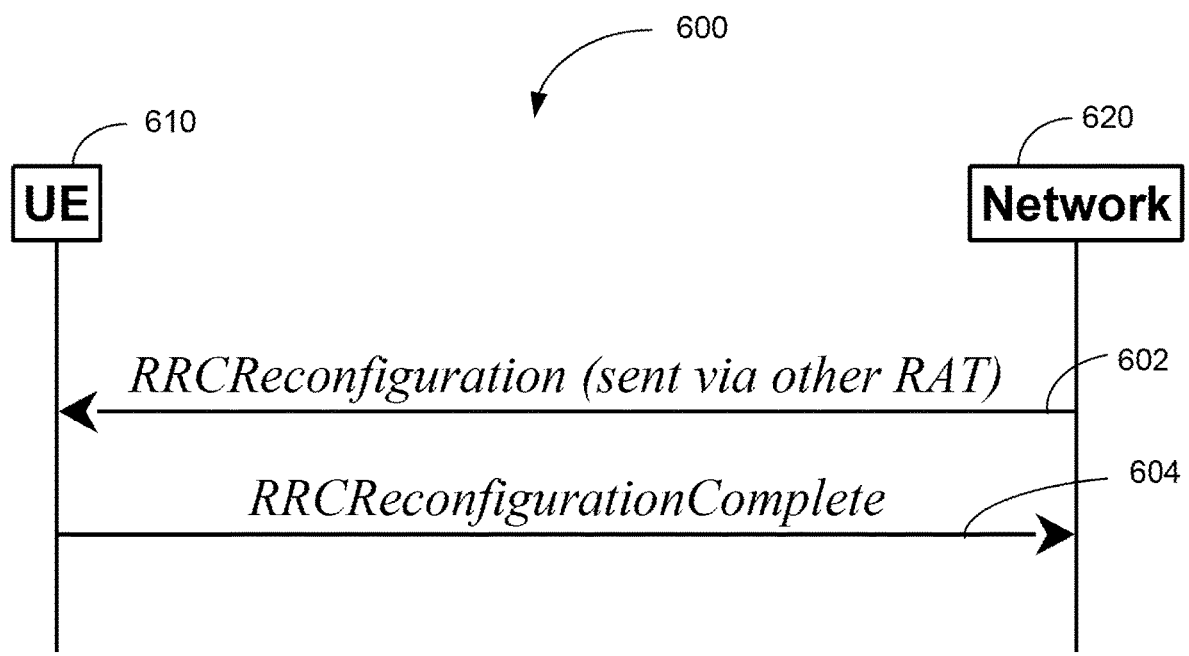
FIG. 6 is a schematic diagram illustrating an inter-Radio Access Technologies (inter-RAT) handover procedure, according to an implementation of the present disclosure.

The NTN assistance information may be transmitted by the dedicated control signaling of other RATs (e.g., from E-UTRA to NR or vice versa). FIG. 6 is a schematic diagram illustrating an inter-RAT handover procedure 600, according to an implementation of the present disclosure. As illustrated in FIG. 6, the serving Network 620 (which is E-UTRAN in this embodiment) may transmit a dedicated control signaling to the UE 610, to initiate an inter-RAT handover procedure. In one example, the dedicated control signaling may be RRCReconfiguration message (e.g., action 602) (e.g., the RRCConnectionReconfiguration message of the E-UTRA protocols) that includes the IE 'mobilitycontrolinfo'. The NTN assistance information may be included in the IE 'mobilitycontrolinfo' or in the LTE RRC Connection Reconfiguration message. After the UE performs the inter-RAT handover procedure with the target NR cell (e.g., transmitting a preamble of a RA procedure based on the decided $N_{TA\_pre}$), the UE may transmit the RRCReconfigurationComplete message (e.g., action 604) to a target cell (e.g., the serving network 620).

Alternative 4: Validity-Life-Period Timer for the Received NTN Assistance Information In some implementations, a validity-life-period timer may be configured to define the valid time of the received NTN assistance information that the UE receives from a dedicated control signaling. For example, the value of the validity-life-period timer may be pre-defined in the 3GPP technical specification or the serving NTN cell may configure a UE-specific validity-life-period timer to the UE, where the configured value of the validity-life-period timer may also be transmitted to the UE along with the NTN assistance information. Therefore, the UE may start to count the validity-life-period timer after the UE receives the NTN assistance information. The UE may consider the received NTN assistance information is valid until the validity-life-period timer reaches zero. After the validity-life-period timer reaches zero, the UE may drop/release the stored NTN assistance information. In some implementations, the T304 (e.g., the T304 of NR protocols or the T304 of LTE protocols) timer may be the default validity-life-period timer for the received NTN assistance information for a handover procedure. In some examples, the UE may trigger RRC Connection re-establishment procedure if the validity-life-period timer expires.

In some examples, UE may start to count the validity-life-period timer after the UE initiates the (inter-RAT/intra-RAT) handover procedure. Then, after the validity-life-period timer reaches zero, the UE may drop/release the stored NTN assistance information. In addition, after the UE drops or releases the stored NTN assistance information, the UE may try to re-obtain the NTN assistance information broadcasted by the associated target cell (e.g., broadcasting via SI transmission).

Self-Stored NTN Assistance Information

The UE may perform a preamble transmission of a RA procedure by the stored NTN assistance information.

In one implementation, during (intra-RAT/inter-RAT) handover procedure, the UE may store the latest TA information associated with the source cell (e.g., $N_{TA\_source}$). In addition, the stored TA information may become the basis when the UE tries to align its uplink TA with the target cell. For example, the UE may apply the stored TA information as the common TA value (e.g., $N_{TA\_common}$) to transmit the preamble to the target cell. In some examples, the UE may decide the value of $N_{TA\_target}$ by applying the stored $N_{TA\_source}$. The $N_{TA\_target}$ is obtained based on the equation (3).

$$N_{TA\_target} = N_{TA\_source} \quad (3)$$

In some implementations (e.g., handover procedure or conditional handover procedure), the UE may receive (conditional) handover command (e.g., via an RRC signaling) that includes one or more candidate cells and NTN assistance information associated with the candidate cells, from the serving cell. After the UE receives the (conditional) handover command from the source cell, the UE may monitor the target cell and then decide to initiate a handover procedure. However, when (or before) the UE initiates the handover procedure with a target cell selected among the candidate cells, the UE may still receive a dedicated control signaling that includes the NTN assistance information (e.g., a TA command associated with at least one target cell (e.g., $T_{A\_target}$), from the source cell. Therefore, the UE may decide the $N_{TA}$ value of the selected target cell by referring to the stored $N_{TA\_source}$ and/or the latest $T_{A\_target}$ value indicated by a MAC CE, and the UE performs a preamble transmission of a RA procedure with the selected target cell according to the $T_{A\_target}$, that is obtained based on the equation (4).

$$N_{TA\_target} = N_{TA\_source} + (N_{TA\_target} - 31) \cdot 16 \cdot 64/2^\mu \quad (4)$$

In some implementations, the format of the MAC CE may include target cell information (e.g., a cell identity associated with at least one target cell or an index associated with a target cell, where the index may be indicated implicitly based on the sequence of candidate cells appeared in the (conditional) handover command), so the UE knows to adjust TA value based on the received MAC CE to transmit the preamble to the target cell. In one example, an indicator that indicates that the MAC CE is not associated with the source cell but is associated with the target cell may be included in the MAC CE. Thus, the UE knows that the MAC CE is associated with the target cell rather than the source cell.

In some implementations, the serving NTN cells may appear to a UE regularly (e.g., in a time domain). Thus, the UE may record the historical $N_{TA}$ values that the UE receives from each serving NTN cell that the UE has been associated with a historic record.

In one example, the UE may record the first $N_{TA}$ value that the UE has adjusted after receiving the RAR message of the RA procedure from the serving cell during the handover procedure.

In another example, the UE may record the first $N_{TA}$ value that the UE has adjusted after receiving the first MAC CE (that contains TA value indication) from the serving cell.

In other examples, the UE may record the first $N_{TA}$ value that the UE has been estimated in the previous time such as based on the GNSS information, so the UE may calculate the $N_{TA}$ value associated with the target cell once and then the UE may store and reuse the stored $N_{TA}$ value next time when the UE initiates a (2-step/4-step) RA procedure with the same associated target cell again.

Moreover, the UE may maintain a historical table (as illustrated in Table 2) to maintain the record of $N_{TA}$ value with at least one serving NTN cell. Thus, when the UE tries to access the same serving NTN cell, the UE may decide the $N_{TA}$ value based on the stored historical table. In some examples, the $N_{TA}$ values of each corresponding NTN cell may also be pre-configured (e.g., pre-installed in USIM of the UE or through receiving the (NAS layer/AS layer) control signaling from a serving RAN).

TABLE 2

Serving NTN cell record

| Cell ID | (stored) TA configuration |
| --- | --- |
| NTN Cell#1 | $N_{TA\_initial\#1}$ |
| NTN Cell#2 | $N_{TA\_initial\#2}$ |
| ... | ... |
| NTN Cell#K | $N_{TA\_initial\#K}$ |

In one implementation, a UE may be allowed to transmit a preamble if a valid NTN assistance information to the associated target cell is stored or the UE is required to obtain the latest NTN assistance information to estimate the $N_{TA\_pre}$ value. Otherwise, the UE may not be allowed (or the UE may be disabled) to transmit the preamble to the target cell.

It is noted that the UE may decide which rule (e.g., Rule #A: the UE sets default configuration (e.g., $N_{TA}=0$ or other value), or Rule #B: the UE sets $N_{TA}=N_{TA\_pre}$=stored TA configuration) based on whether the UE has stored NTN assistance information of the concerned NTN cell (e.g., a target cell to which the UE is preparing to transmit a preamble). The UE may apply Rule #B if the UE has stored NTN assistance information with the concerned NTN cell. Otherwise, the UE may apply Rule #A if the UE does not have stored NTN assistance information associated with the concerned cell (or the UE may try to (re)obtain the NTN assistance information broadcasted by the concerned NTN cell before the UE initiates a RA procedure with the serving NTN cell). The rules may be pre-defined in the 3GPP technical specification.

In some implementations, the stored NTN assistance information (to be associated with one or more NTN cell(s)) may be associated with a validity-life-counter. The UE may initiate and count the validity-life-counter to zero when the UE stores the NTN assistance information of the serving NTN cell (no matter it is the first time that the UE records the NTN assistance information of the serving NTN cell or the UE is modifying/updating the stored NTN assistance information of the serving NTN cell). When the validity-life-counter associated with the stored NTN assistance information is counted to zero, the UE may release the stored NTN assistance information of the associated NTN cell. In some implementations, the UE may update the latest NTN assistance information associated with the serving NTN cell (e.g., by receiving the NTN assistance information broadcasted by the serving NTN cell) after the UE releases the stored NTN assistance information of the NTN cell (even if the UE does not transmit a preamble to the serving NTN cell). In some implementations, the UE may not update the latest NTN assistance information immediately after the UE releases the stored NTN assistance information of the serving NTN cell. In this case, the UE may update (or re-obtain) the stored NTN assistance information when the UE transmits a preamble to the serving NTN cell later. The value of validity-life-counter may be configured by the serving cell, be pre-installed in USIM of the UE, or be pre-defined in the 3GPP technical specification.

There are two scenarios for applying the pre-compensation (e.g., $N_{TA\_pre}$ estimation and setting).

Scenario 1: timing Advance Group (TAG)

It is noted that the $N_{TA\_pre}$ estimation mechanism may be applied to the UEs to which more than one TAGs are configured. A TAG is a group of serving cells that is configured by RRC signaling (e.g., RRC Connection Reconfiguration message) with the same timing reference cell and the same TA value. A TAG including the SpCell of a MAC entity is referred to as Primary Timing Advance Group (PTAG), whereas the term Secondary Timing Advance Group (STAG) refers to other TAGs. Each TAG is configured with one TAG Identity (TAG ID) and the TAG containing the SpCell has the TAG Identity 0. In some examples, NTN assistance information may be associated with one or more TAGs (e.g., one NTN assistance information may be associated with one or more TAG IDs). In other examples, each TAG, which may be a PTAG or STAG, may be associated with one independent NTN assistance information (e.g., via a dedicated controlling signaling that includes NTN assistance information for a UE, the NTN assistance information may be associated with one specific TAG ID that is configured to the UE by the serving cell).

Scenario 2: Impact to Cell (Re)Selection Procedure

In one implementation, an NTN cell may configure separate RA resources based on UE's capabilities. For example, if there are UEs that have GNSS and non-GNSS capabilities, and thus the NTN cell may apply different RA schemes. That is, the NTN cell may separate the resources for RA access, so that the UEs with or without GNSS capabilities may perform RA procedures with different RACH resources. For the convenience of explanation, definitions for separate RA resources are disclosed as follows:

"Type 1 RACH resource" is the RACH resource configured for the UEs that are capable to perform the (timing advance and doppler frequency offset) pre-compensation (e.g., based on their GNSS capability and satellite ephemeris information).

"Type 2 RACH resource" is the RACH resource configured for the UEs that are not capable to perform the pre-compensation.

"Type 1 UE" is the UE that is capable to perform the pre-compensation (e.g., based on their GNSS capability).

"Type 2 UE" is the UE that is not capable to perform the pre-compensation (e.g., Internet-of-Thing (IoT) devices).

In some implementations, a serving NTN cell may transmit configurations of both Type 1/2 RACH resources to the UEs (e.g., via SIB1 transmission). In some implementations, a serving NTN cell may transmit a configuration of Type 1 RACH resource to the UEs (e.g., via SIB1) and this kind of cell is called Type 1 cell in the present disclosure (for example, the Type 1 cell may be deployed in an NTN cell that only supports normal UEs that have GNSS capability and the capability of pre-compensation). In this case, a Type 2 UE (for example, Type 2 UE may be an IoT device or an MTC device that does not have GNSS capability and the capability of pre-compensation) may not camp on a Type 1 cell during cell (re)selection procedure. In addition, the Type 2 UE may consider the Type 1 cell as a barred cell to the Type 2 UE itself or the Type 2 UE may consider the Type 1 cell as an acceptable cell during the cell (re)selection procedure (so that the Type 2 UE may move to 'camped on any cell state' if the Type 2 UE decides to camp on the Type 1 cell). In one implementation, if the UE considers a cell as a barred cell, the UE may bar the cell for a time duration pre-installed in USIM of the UE (e.g., 300 seconds).

In some examples, one NTN cell may transmit a configuration of Type 2 RACH resource to the UEs (e.g., via SIB1 transmission) and this kind of cell is called Type 2 cell in this present disclosure (for example, the Type 2 cell may be deployed in an NTN cell that only supports IoT devices that do not have GNSS capability and the capability of pre-compensation). In this case, both Type 1 and Type 2 UEs may access Type 2 cell without additional limitation. In addition, the Type 1 UE may transmit a preamble by setting $N_{TA}$=0 and the Type 1 UE may not perform the pre-compensation to the serving (Type 2) cell when the Type 1 UE transmits the preamble to the serving (Type 2) cell. In some examples, the Type 1 UE may perform the pre-compensation when the Type 1 UE transmits the preamble to the Type 2 cell (or a Type 2 RACH resource associated with the serving cell). In other examples, the Type 1 UE may not camp on the Type 2 cell during the cell (re)selection procedure. In addition, the Type 1 UE may consider the Type 2 cell as a barred cell to the Type 1 UE itself or the Type 1 UE may consider the Type 2 cell as an acceptable cell during the cell (re)selection procedure (so the Type 1 UE may move to 'camped on any cell state' if the Type 1 UE decides to camp on a Type 2 cell). In one implementation, if the UE considers a cell as a barred cell, the UE may bar the cell for a time duration pre-installed in USIM of the UE (e.g., 300 seconds).

In some examples, the Type 1 UE may give (or consider) Type 1 cell(s) higher priority (in comparison with Type 2 cell(s)) when the Type 1 UE performs cell (re)selection procedure. In some examples, the Type 1 UE may give (or consider) the frequency carrier on which Type 1 cell is found by the UE with a higher priority during the cell (re)selection procedure (in comparison with the frequency carrier on which Type 1 cell is not yet found by the UE). In some examples, if the Type 1 UE can only find Type 1 cells while camping on a frequency, the UE may consider that frequency to be the highest priority during the cell (re)selection procedure.

In some examples, the Type 2 UE may give (or consider) Type 2 cell(s) with a higher priority (in comparison with Type 1 cell(s)) when the Type 2 UE performs cell (re)selection procedure (if Type 1 cell is not considered barred by the Type 2 UE). In some examples, the Type 2 UE may give (or consider) the frequency carrier which Type 2 cell is found by the UE with a higher priority during the cell (re)selection procedure (in comparison with the frequency carrier which Type 2 cell is not yet found by the UE). In some examples, if the Type 2 UE can only find Type 2 cells while camping on a frequency, the UE may consider that frequency to be the highest priority during the cell (re) selection procedure.

Figure 7:
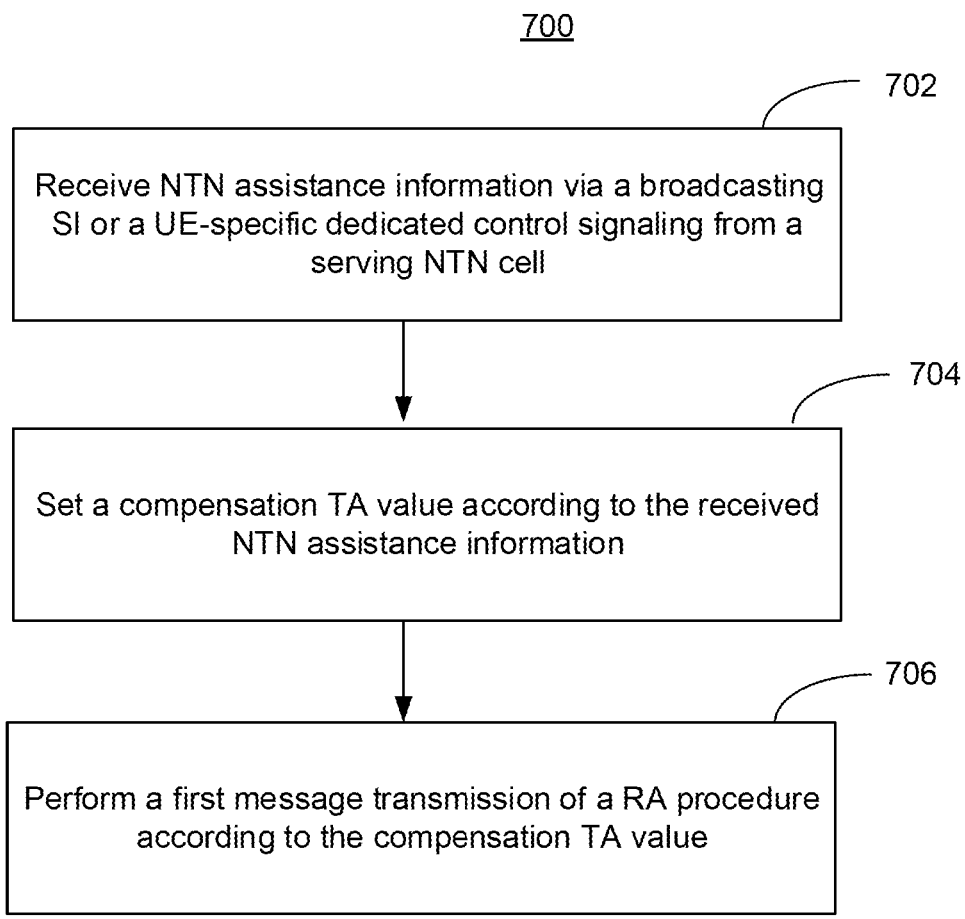
FIG. 7 is a flowchart illustrating a method of timing advance adjustment, according to an implementation of the present disclosure.

FIG. 7 is a flowchart illustrating a method 700 of timing advance adjustment, according to an implementation of the present disclosure. In action 702, the UE receives NTN assistance information via a broadcasting SI or a UE-specific dedicated control signaling from a serving NTN cell. The NTN assistance information may include at least one of a common TA value (e.g., $N_{TA\_common}$), location information associated with the serving NTN cell and a reference point, a feeder link delay between the serving NTN cell and the reference point, and the satellite ephemeris information of the serving cell and/or one or more neighbor cells. In action 704, the UE sets a compensation TA value according to the received NTN assistance information. In action 706, the UE performs a first message transmission of a RA procedure according to the compensation TA value.

It is noted that the first message transmission of the RA procedure is a MSG1 during a 4-step R procedure (e.g., CBRA or CFRA procedure) or an MSGA of a 2-step RA procedure (e.g., CBRA or CFRA procedure).

In one example, the UE may receive a control signaling indicating a configuration for the common TA value (e.g., $N_{TA\_common}$), and then the UE may set the compensation TA value according to the configuration for the common TA value.

Figure 8:
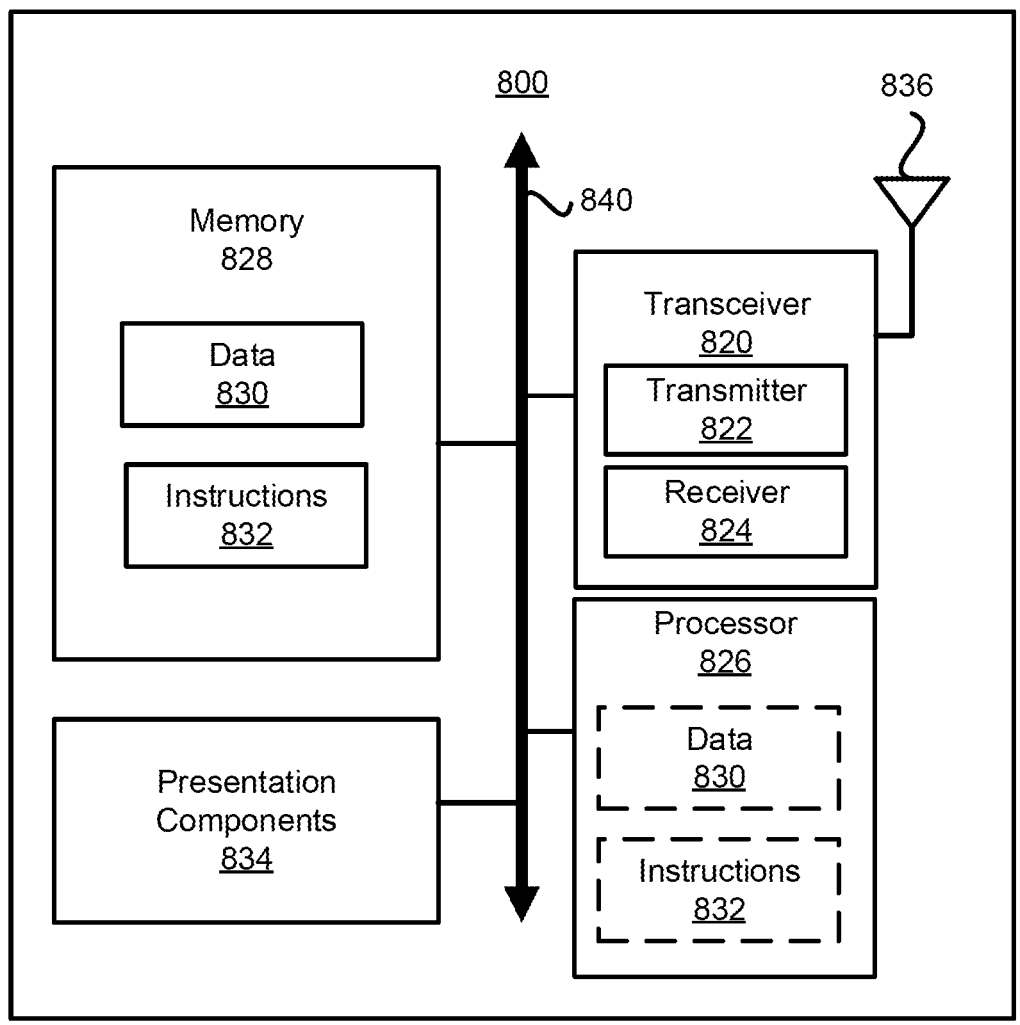
FIG. 8 is a block diagram illustrating a node for wireless communication, according to an implementation of the present disclosure.

FIG. 8 is a block diagram illustrating a node 800 for wireless communication, according to an implementation of the present disclosure.

As illustrated in FIG. 8, the node 800 may include a transceiver 820, a processor 826, a memory 828, one or more presentation components 834, and at least one antenna 836. The node 800 may also include a RF spectrum band module, a BS communications module, a network communications module, and a system communications management module, input/output (I/O) ports, I/O components, and a power supply (not illustrated in FIG. 8). Each of these components may be in communication with each other, directly or indirectly, over one or more buses 840. The node 800 may be a UE or a BS that performs various disclosed functions illustrated in FIG. 7.

The transceiver 820 may include a transmitter 822 (with transmitting circuitry) and a receiver 824 (with receiving circuitry) and may be configured to transmit and/or receive time and/or frequency resource partitioning information. The transceiver 820 may be configured to transmit in different types of subframes and slots including, but not limited to, usable, non-usable and flexibly usable subframes and slot formats. The transceiver 820 may be configured to receive data and control channels.

The node 800 may include a variety of computer-readable media. Computer-readable media may be any media that can be accessed by the node 800 and include both volatile (and non-volatile) media and removable (and non-removable) media. Computer-readable media may include computer storage media and communication media. Computer storage media may include both volatile (and/or non-volatile) media, as well as removable (and/or non-removable) media, implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 828 may include computer-storage media in the form of volatile and/or non-volatile memory. The memory 828 may be removable, non-removable, or a combination thereof. For example, the memory 828 may include solid-state memory, hard drives, optical-disc drives, etc. As illustrated in FIG. 8, the memory 828 may store computer-readable and/or computer-executable instructions 832 (e.g., software codes) that are configured to, when executed, cause the processor 826 (e.g., processing circuitry) to perform various disclosed functions. Alternatively, the instructions 832 may not be directly executable by the processor 826 but may be configured to cause the node 800 (e.g., when compiled and executed) to perform various disclosed functions.

The processor 826 may include an intelligent hardware device, a central processing unit (CPU), a microcontroller, an ASIC, etc. The processor 826 may include memory. The processor 826 may process the data 830 and the instructions 832 received from the memory 828, and information through the transceiver 820, the baseband communications module, and/or the network communications module. The processor 826 may also process information to be sent to the transceiver 820 for transmission via the antenna 836, to the network communications module for transmission to a CN.

One or more presentation components 834 may present data to a person or other devices. Presentation components 834 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for performing, by a user equipment (UE), a non-terrestrial network (NTN) assistance information update procedure, the method comprising:
    receiving, from a first cell, a handover command comprising first NTN assistance information associated with the first cell, the handover command indicating a second cell as a target cell for a handover procedure;
    storing the first NTN assistance information;
    performing the NTN assistance information update procedure based on the handover command;
    selecting the second cell to camp on according to the handover command that comprises the first NTN assistance information;
    receiving, from the second cell, an NTN-specific system information block (SIB) after selecting the second cell to camp on, the NTN-specific SIB indicating a validity time period;
    obtaining, from the second cell, second NTN assistance information associated with the validity time period;
    replacing the stored first NTN assistance information with the second NTN assistance information; and
    counting down an NTN validity timer corresponding to the validity time period to zero.

2. The method of claim 1, wherein the first cell and the second cell are supported by either an Evolved Universal Terrestrial Radio Access (E-UTRA) network or a New Radio (NR) network.

3. The method of claim 1, wherein the first NTN assistance information includes at least one of a common timing advance value, location information associated with a serving cell and a reference point, or a feeder link delay between the serving cell and the reference point.

4. A user equipment (UE) for performing a non-terrestrial network (NTN) assistance information update procedure, the UE comprising:
    at least one processor; and
    at least one non-transitory computer-readable medium coupled to the at least one processor and storing one or more computer-executable instructions that, when executed by the at least one processor, cause the UE to:
- receive, from a first cell, a handover command comprising first NTN assistance information associated with the first cell, the handover command indicating a second cell as a target cell for a handover procedure;
- store the first NTN assistance information;
- perform the NTN assistance information update procedure based on of the handover command;
- select the second cell to camp on according to the handover command that comprises the first NTN assistance information;
- receive, from the second cell, an NTN-specific system information block (SIB) after selecting the second cell to camp on, the NTN-specific SIB indicating a validity time period;
- obtain, from the second cell, second NTN assistance information associated with the validity time period;
- replace the stored first NTN assistance information with the second NTN assistance information; and
- count down an NTN validity timer corresponding to the validity time period to zero.

5. The UE of claim 4, wherein the first cell and the second cell are supported by either an Evolved Universal Terrestrial Radio Access (E-UTRA) network or a New Radio (NR) network.

6. The UE of claim 4, wherein the first NTN assistance information includes at least one of a common timing advance value, location information associated with a serving cell and a reference point, or a feeder link delay between the serving cell and the reference point.

* * * * *